United States Patent [19]

Gilchrist

[11] 3,812,353

[45] May 21, 1974

[54] METHOD FOR DETERMINING FORMATION PARAMETERS

[75] Inventor: James L. Gilchrist, Austin, Tex.

[73] Assignee: Continental Oil Company, Ponca City, Okla.

[22] Filed: Oct. 6, 1971

[21] Appl. No.: 187,121

[52] U.S. Cl. .......................... 250/83.3, 250/83.6 W
[51] Int. Cl. ............................................... G01t 1/16
[58] Field of Search ...................... 250/83.6 W, 83.3

[56] References Cited
UNITED STATES PATENTS

| | | | |
|---|---|---|---|
| 3,631,245 | 12/1971 | Jordan | 250/83.6 W |
| 3,562,523 | 2/1971 | Richardson | 250/83.6 W |
| 3,638,484 | 2/1972 | Tixier | 250/83.6 W |
| 3,558,888 | 1/1971 | Youman | 250/83.6 W |
| 2,469,462 | 5/1949 | Russell | 250/83.6 W |

*Primary Examiner*—James W. Lawrence
*Assistant Examiner*—Harold A. Dixon
*Attorney, Agent, or Firm*—Joseph C. Kotarski

[57] ABSTRACT

A method for determining formation parameters such as the effective porosity ($\phi_e$), the formation fraction of bulk volume that is shale ($\rho$) and the formation matrix capture cross section ($\Sigma_{ma}$), utilizing predetermined thermal neutron capture cross sections of a first and a second injected fluid, and the thermal neutron capture cross sections of the formation flooded with the first injected fluid and subsequently flooded with the second injected fluid to determine the formation effective porosity ($\phi_e$); and subsequently utilizing the determined values of the effective porosity ($\phi_e$) and the formation neutron porosity ($\phi_n$) and the porosity of the shale component of the formation ($\phi_{sh}$) to determine the formation fraction of bulk volume that is shale ($\rho$); the determined values of ($\phi_e$) and ($\rho$) being utilized to determine the formation matrix cross section ($\Sigma_{ma}$). The method of the present invention thus provides determined data for calibrating the tool response of a gamma ray type logging tool.

7 Claims, No Drawings

3,812,353

METHOD FOR DETERMINING FORMATION PARAMETERS

BACKGROUND OF THE INVENTION

1. Field of the Invention

The method of the present invention relates generally to a method for determining formation parameters and, more particularly, but not by way of limitation, to a method for determining formation parameters wherein the formation is flooded with fluids having a predetermined thermal neutron capture cross sections to obtain field determined data to determine various formation parameters.

2. Description of the Prior Art

In the past, various reservoir formation parameters have been determined from field-determined data obtained utilizing the tool responses of a number of so-called "logging tools" such as, for example, a Density Log, a Sonic Log, a Resistivity Log, an Induction Log and a Gamma Ray Log, and various other such logs. The responses obtained from logging-runs utilizing such logging tools, as mentioned above, essentially plot the logging tool response at various borehole depths. The responses of a number of logging-runs are generally then quantitatively analyzed to determine the desired formation parameters.

The Gamma Ray Log, mentioned above, basically provides a measurement of the natural radioactivity of the formation and such logs are generally calibrated in API (radioactivity) units. The Gamma Ray Log is sometimes utilized as a substitute for the "Spontaneous-Potential" curve, which is a recording of the difference between the potential of a movable electrode in the borehole of the reservoir formation and a fixed potential of a surface electrode versus the borehole depth.

The tool response of the Gamma Ray Log has been utilized to indicate the shaliness of the formation at various borehole depths, and the deviation of the tool response of the Gamma Ray Log has been, in the past, generally assumed to be linear generally between a "0" percent and a "100" percent shaliness indication. Following the above mentioned assumption, the assumed values of formation shaliness were subsequently utilized to determine various formation parameters.

It has been found that the deviation of the Gamma Ray Log is generally not linear, and, in many instances, an assumption of linearity can lead to many erroneously determined formation parameters.

SUMMARY OF THE INVENTION

The method of the present invention contemplates, in one aspect thereof, injecting a first injected fluid of a predetermined thermal neutron capture cross section in a formation zone of interest and subsequently determining the thermal neutron capture cross section of the formation zone of interest flooded with the first injected fluid. A second injected fluid of a predetermined thermal neutron capture cross section is then injected in the formation zone of interest and the thermal neutron capture cross section of the formation zone of interest flooded with the second injected fluid is subsequently determined. The field determined data thus obtained is then utilized to determine the formation effective porosity. The formation neutron porosity and the porosity of the shale component of the formation is then determined generally in the formation zone of interest, and the fraction of bulk volume that is shale and the formation matrix capture cross section are then determined.

An object of the invention is to provide a method for more accurately determining formation parameters, particularly useful in shaley pay sands.

One other object of the invention is to provide a method for determining formation parameters in a more efficient and economical manner.

A further object of the invention is to provide a method for determining the formation effective porosity in a more economical manner.

A still further object of the invention is to provide a more accurate indication of formation shaliness, particularly useful to calibrate the tool response of a Gamma Ray Log.

Another object of the invention is to provide a method for determining the formation fraction of bulk volume that is shale in a more accurate and efficient manner.

Yet another object of the invention is to provide a method for determining the formation matrix capture cross section in a more accurate and efficient manner.

Other objects and advantages of the invention will be evident from the following detailed description.

DESCRIPTION OF THE PREFERRED EMBODIMENTS

The method of the present invention provides a determination of various formation parameters such as, for example, the formation matrix capture cross section, designated generally in the art and below by the symbol sigma ($\Sigma_{ma}$); the formation effective porosity, generally designated in the art and below by the symbol ($\phi_e$), and the fraction of bulk volume that is shale or, in other words, an indicator as to the shaliness of a particular formation, designated below by the symbol ($\rho$), in a more efficient and accurate manner. The formation shaliness indicator ($\rho$) is also useful in calibrating the tool response of a Gamma Ray Log, as will be made more apparent below.

The formation parameters mentioned above are not only useful in evaluating a formation with respect to a particular borehole, but some of the formation potential parameters such as, for example, the formation matrix capture cross section ($\Sigma_{ma}$) and the shaliness indicator ($\rho$) can be subsequently utilized to more accurately determine and interpret various formation parameters relative to other boreholes in the same formation. The formation parameters determined in accordance with the present invention are utilized to determine various other formation parameters, such as, for example, hydrocarbon saturation or water saturation, thereby providing more accurate qualitative interpretation data relative to the particular formation being studied, in a manner to be described in greater detail below.

The method of the present invention utilizes field determined data obtained from various "logging tools" and, more particularly, the "tool response" of such logging tools. The term "logging" and "tool response" are well known in the art, and generally refer to a plot of a particular parameter as a function of borehole depth. The terms "logging" and "log-runs" are also generally utilized in the art and below to refer to the apparatus and the method or technique of utilizing such apparatus to obtain the desired plots referred to above.

It should be noted that in analyzing a particular formation and, more particularly, in analyzing the tool response of certain logging tools, the portion of shale or the shaliness of a particular formation affects the tool responses of the various logs, and is generally treated separately with respect to the interpretation and analysis of the various tool responses to determine many of the formation parameters required to analyze a particular formation. For example, a Gamma Ray Log has been utilized in the past as an indication of formation shaliness. The Gamma Ray type of logging tool and the tool response obtained utilizing such logging tool are well known in the art, and a detailed description of the apparatus and the field determined data obtained utilizing such apparatus is not required herein.

The deflection of a Gamma Ray Log tool response has been generally considered to provide an indication of the shaliness of a formation at a particular borehole depth and, more particularly, the tool response of a Gamma Ray Log generally between an indication of (0) percent shale and an indication of (100) per cent shale has been assumed to be linear. In other words, it has been considered in the past that the deflection of the tool response of a Gamma Ray Log generally between minimum and maximum is linear in that the shale content of the formation at the particular borehole depth linearly increases and decreases between an indication of (0) percent and an indication of (100) per cent shale.

It has recently been found that the assumption of linearity, mentioned above with respect to the tool response of the Gamma Ray Log, is not precisely accurate and, in some instances, introduces substantial error in the determination of the various formation parameters. More particularly, it has been found that the Gamma Ray intensity, as indicated by the tool response of a Gamma Ray Log, is usually not linear with respect to the per cent or amount of shale in the formation. Thus, in one aspect, the method of the present invention contemplates the determination of a calibration factor which can be utilized in cooperation with the tool response of a Gamma Ray Log, or the like, to correct the tool response of the Gamma Ray Log to more accurately reflect or indicate the formation shaliness.

The method of the present invention contemplates the utilization of field determined data obtained from two logging-runs, in one aspect thereof, and the field determined data obtained from one additional logging-run, in one other aspect thereof, to determine the various formation parameters. More particularly, the method of the present invention utilizes field determined data obtained from the tool responses of two logging-runs utilizing a logging tool having a tool response indicative of the thermal neutron capture cross section to determine the formation effective porosity ($\phi_e$) and the capture cross section of the formation and shale ($\Sigma_r$). These determined formation parameters are subsequently utilized in combination with the tool response of a logging tool having a tool response indicative of the formation neutron porosity ($\phi_n$) and the porosity of the shale component of the formation ($\phi_{sh}$) to determine the fraction of bulk volume of the formation that is shale ($\rho$) and the formation matrix capture cross section ($\Sigma_{ma}$), in a manner to be made more apparent below.

Various logging tools are available in the art which have a tool response indicative of the thermal neutron capture cross section ($\Sigma_n$) as a function of borehole depth. One such logging tool is referred to generally as a "pulsed neutron" type of logging tool. The pulsed neutron type of logging tool has a tool response indicative of the time required or the rate at which thermal neutrons generated and emitted at predetermined intervals by the pulsed neutron type of logging tool are captured or absorbed by the formation material. In this type of logging tool, the neutron generator is generally an electro-mechanical source which emits neutrons in controlled repetitive bursts. The tool response of the pulsed neutron type of logging tool indicates the macroscopic absorption cross section of the formation, referred to generally in the art and below as the thermal neutron capture cross section.

One such logging tool, for example, is sole under the tradename THERMAL DECAY TIME LOG of Schlumberger, Limited of New York, New York, and one other such pulsed neutron type of logging tool, for example, is sold under the name NEUTRON LIFETIME LOG of Dresser Industries Inc. of Houston, Texas. Such logging tools are well known in the art and a detailed description of the apparatus and the field determined data or tool response obtained utilizing such apparatus is not required herein.

Referring more particularly to the method of the present invention, the hydrocarbons are initially swept from the region of interest with a miscible fluid injected into the borehole to substantially sweep the hydrocarbons from that region, preferably a region at least 2 feet radially outwardly from the wall formed by the borehole per se. After the region of interest around the borehole has been cleared of hydrocarbons, as described generally above, a first injected fluid having a predetermined thermal neutron capture cross section, designated below by the symbol ($\Sigma_{w1}$) is injected into the region or formation zone of interest and the zone is then logged with a first logging tool of the pulsed neutron type. The tool response of the first logging tool, is thus indicative of the thermal neutron capture cross section of the formation flooded with the first injected fluid, designated generally below by the symbol ($\Sigma_1$).

A second injected fluid having a known thermal neutron capture cross section, generally designated below by the symbol ($\Sigma_{w2}$), is then injected into the formation zone of interest. After the first injected fluid has been substantially replaced by the second injected fluid, having a different thermal neutron capture cross section, a second logging-run is made with a second logging tool which is also of the pulsed neutron type. The tool response of the second logging tool is thus indicative of the formation thermal neutron capture cross section, generally designated below by the symbol ($\Sigma_2$), flooded with the second injected fluid.

The thermal neutron capture cross section of the first and the second injected fluids can be determined in various ways such as, for example, by placing a predetermined amount of the particular fluid in a tank and utilizing a logging tool of the pulsed neutron type to determine the thermal neutron capture cross section of that fluid in a manner similar to the utilization of the pulsed neutron type of logging tool to determine the thermal neutron capture cross section of the formation. The thermal capture cross section of the particular fluid may also be determined in other ways such as, for example, water analysis. The determination of the thermal capture cross section of the first injected fluid and the second injected fluid by either method or by other similar methods is well known in the art and a detailed description thereof in not required herein.

It should also be noted that the term "zone of interest" as used above and below generally refers to a particular range of borehole depths.

Utilizing the tool responses of the first logging tool and the second logging tool obtained from the initial two logging runs, the formation effective porosity ($\phi_e$) is determined utilizing the following algebraic expression:

$$\phi_e = \Sigma_2 - \Sigma_1/\Sigma_{w2} - \Sigma_{w1} \qquad (1)$$

Wherein:
$\phi_e$ = The formation effective porosity (water filled porosity) at predetermined borehole depths;
$\Sigma_1$ = The thermal neutron capture cross section of the formation flooded with the first injected fluid at predetermined borehole depths, as indicated by the tool response of the first logging tool;
$\Sigma_2$ = The thermal neutron capture cross section of the formation flooded with the second injected fluid at predetermined borehole depths, as indicated by the tool response of the second logging tool;
$\Sigma_{w1}$ = The determined thermal neutron capture cross section of the first injected fluid; and
$\Sigma_{w2}$ = The determined thermal neutron capture cross section of the second injected fluid.

Utilizing the determined thermal neutron capture cross sections of the first and the second injected fluids and the tool responses indicative of the thermal neutron capture cross section of the formation flooded with the first and the second injected fluids, the thermal neutron capture cross section of the formation and shale, generally designated below by the symbol ($\Sigma_r$) can then be determined as follows:

$$\Sigma_r = [\Sigma_1 \Sigma_{w2} - \Sigma_2 \Sigma_{w1}/(\Sigma_{w2} - \Sigma_{w1}) - (\Sigma_2 - \Sigma_1)]$$

The formation neutron porosity ($\phi_n$), and the porosity of the shale component of the formation ($\phi_{sh}$) is then determined by running a third logging tool in the borehole in the formation having a tool response indicative of the parameters ($\phi_n$) and ($\phi_{sh}$). Various logging tools are available in the art having a tool response indicative of ($\phi_n$) and ($\phi_{sh}$), and one such logging tool is generally referred to simply as a "conventional neutron logging tool." In this type of logging tool neutrons are continuously emitted from a radioactive source and the tool response of the particular neutron log is indicative either of the gamma rays emitted by the capturing nucleus or, in some instances, the neutrons per se are counted by a detector in a sonde. Such logging tools are well known in the art and a detailed description of the apparatus and the field determined data or tool response obtained utilizing such apparatus, is not required herein.

The formation parameters of ($\phi_n$) and ($\phi_{sh}$) are thus obtained from the tool response of the third logging tool in the zone of interest. The formation effective porosity ($\phi_e$) is related to the neutron porosity ($\phi_n$) by the following algebraic expression:

$$\phi_n = \phi_e + \rho \phi_{sh} \qquad (3)$$

Wherein:
$\phi_{sh}$ = The porosity of the shale component of the formation; and
$\rho$ = The formation fraction of bulk volume that is shale.

The algebraic expression (3) above can be rewritten to determine the formation fraction of bulk volume that is shale ($\rho$) as follows:

$$\rho = \phi_n - \phi_e/\phi_{sh} \qquad (4)$$

The formation fraction of bulk volume that is shale ($\rho$) can thus be determined at various borehole depths within the area or zone of interest in the formation utilizing values of neutron porosity ($\phi_n$) and the porosity of the shale component in the formation ($\phi_{sh}$) obtained from the field determined data utilizing the tool response of the third logging tool and the determined values of the effective porosity ($\phi_e$) determined previously.

The values of "$\rho$", obtained from the algebraic expression (4) above, provide an indication of the formation shaliness at predetermined borehole depths, which is then utilized to determine various other formation parameters such as, for example, the formation hydrocarbon or water saturation values at predetermined borehole depths. The determined values of the formation fraction of bulk volume that is shale ($\rho$), determined from the algebraic expression (4) above, also provides what is referred to below as a "shale calibration factor" to aid in the quantitative interpretation of the tool response of a Gamma Ray Log, as will be described in grater detail below.

As mentioned before, the tool response of a Gamma Ray Logging tool was generally assumed to be linear, however, this assumption has been found to introduce substantial error in many instances. Utilizing the values of $\rho$ determined utilizing the algebraic expression (4) above, the tool response of a Gamma Ray Logging tool can then be scaled or calibrated between a maximum and a minimum deflection to determine the per cent shale or the shaliness of the formation at particular deflections as indicated by the tool response of the Gamma Ray Logging tool. For example, if the value of $\rho$ where determined to be 0.5 at a particular borehole depth and the tool response of the Gamma Ray Logging tool indicated a shaliness of 0.4 at that particular bore-hole depth, then at a 0.4 shale deflection of the tool response of a Gamma Ray Logging tool, it would be determined that the actual formation shaliness or the actual formation fraction of bulk volume that is shale would be 50 per cent or 0.5.

Utilizing various determined values of $\rho$ at the other borehole depths and the corresponding deflections of the tool response of the Gamma Ray Log, the tool response of the Gamma Ray Log can then be calibrated to correctly indicate the amount of shale or the shaliness of the formation. This calibration can then be utilized to provide a more accurate determination of formation shaliness utilizing the tool response of a Gamma Ray Logging tool run in other boreholes in the same formation.

The thermal neutron capture cross section of the formation and shale ($\Sigma_r$) is related to the formation matrix capture cross section ($\Sigma_{ma}$) by the following algebraic expression:

$$\Sigma_r = (\rho)(\Sigma_{sh}) + (1 - \rho)(\Sigma_{ma}) \quad (5)$$

In the algebraic expression (5) above, it should be noted that the formation rock capture cross section contains or includes the formation shaliness and thus the determined values of ($\Sigma_r$) should vary with respect to different bore-holes in the same formation. The parameter which should not vary substantially with respect to other boreholes in the same formation or adjacent formation is the value of the formation matrix capture cross section ($\Sigma_{ma}$).

Solving the algebraic expression (5) above for the formation matrix capture cross section ($\Sigma_{ma}$), the formation matrix capture cross section ($\Sigma_{ma}$) can be determined utilizing the values of ($\Sigma_r$), ($\rho$) and ($\Sigma_{sh}$), determined previously, from the following algebraic expression:

$$\Sigma_{ma} = [\Sigma_r - (\rho)(\Sigma_{sh})/1 - \rho] \quad (6)$$

The method of the present invention thus provides an accurate and efficient method for determining the formation effective porosity ($\phi_e$), the formation matrix capture cross section and the formation fraction of bulk volume that is shale ($\rho$), which is particularly applicable in substantially 100 per cent water zones. The determined values of ($\rho$) will provide a calibration factor for determining the deviation from linearity of the tool response of a Gamma Ray Log and thus provides a more accurate determination and analysis of various formation parameters which is substantially independent of down-hole conditions. From the foregoing, it will be apparent to those skilled in the art that such a calibration of the Gamma Ray Log response will ultimately provide a more accurate interpretation of other log responses run in shaley formations.

It should be noted that the value of ($\Sigma_{sh}$) utilized in the algebraic expressions (5) and (6) above, represents the thermal neutron capture cross section of the shale component as determined from nearby 100 per cent shale zones utilizing a logging tool of the pulsed neutron type, as described above. The determination of ($\Sigma_{sh}$) is well known in the art and a detailed description thereof is not required herein.

Changes may be made in the particular algebraic expressions utilized to illustrate the various steps of the present invention, and in the various steps of the present invention per se without departing from the spirit and scope of the invention as defined by the following claims:

What is claimed is:

1. A method for determining formation parameters at predetermined depths in a borehole in a zone of interest in the formation, the method comprising:
   determining the thermal neutron capture cross section of a first injected fluid ($\Sigma_{w1}$);
   determining the thermal neutron capture cross section in the formation zone of interest flooded with the first injected fluid ($\Sigma_1$);
   determining the thermal neutron capture cross section of a second injected fluid ($\Sigma_{w2}$);
   determining the thermal neutron capture cross section in the formation zone of interest flooded with the second injected fluid ($\Sigma_2$);
   determining the effective porosity ($\phi_e$) at predetermined borehole depths utilizing the determined values of ($\Sigma_{w1}$), ($\Sigma_{w2}$), ($\Sigma_1$) and ($\Sigma_2$);
   determining the formation neutron porosity ($\phi_n$); determining the porosity of the shale component of the formation ($\phi_{sh}$); and
   determining the formation fraction of bulk volume that is shale ($\rho$) utilizing the algebraic expression:

$$\rho = \phi_n - \phi_e/\phi_{sh}.$$

2. The method of claim 1 defined further to include the steps of:
   determining the thermal neutron capture cross section of the formation and shale ($\Sigma_r$) utilizing the algebraic expression:

$$\Sigma_r = [\Sigma_1\Sigma_{w2} - \Sigma_2\Sigma_{w1}/(\Sigma_{w2} - \Sigma_{w1}) - (\Sigma_2 - \Sigma_1)]; \text{ and}$$

determining the formation matrix capture cross section ($\Sigma_{ma}$) utilizing the algebraic expression:

$$\rho_{ma} = [\Sigma_r - (\rho)(\Sigma_{sh})/1 - \rho].$$

3. A method for determining formation parameters at predetermined depths in a borehole in a zone of interest in the formation utilizing field determined data obtained from the tool responses of logging tools run in a borehole in the formation, the method comprising:
   determining the thermal neutron capture cross section of a first injected fluid ($\Sigma_{w1}$);
   injecting the first injected fluid in the formation zone of interest to substantially flood the formation zone of interest with the first injected fluid;
   running a first logging tool in the borehole in the formation having a tool response indicative of the formation thermal neutron capture cross section;
   determining the thermal neutron capture cross section at predetermined borehole depths in the formation zone of interest flooded with the first injected fluid ($\Sigma_1$) utilizing the tool response of the first logging tool;
   determining the thermal neutron capture cross section of a second injected fluid ($\Sigma_{w2}$);
   injecting the second injected fluid in the formation zone of interest to substantially flood the formation zone of interest with the second injected fluid;
   running a second logging tool in the borehole in the formation having a tool response indicative of the formation thermal neutron capture cross section;
   determining the thermal neutron capture cross section in the formation zone of interest flooded with the second injected fluid ($\Sigma_2$) utilizing the tool response of the second logging tool;
   determining the effective porosity ($\phi_e$) at predetermined borehole depths in the formation zone of interest utilizing the determined values of ($\Sigma_{w1}$), ($\Sigma_{w2}$), ($\Sigma_1$), and ($\Sigma_2$); and
   determining the thermal neutron capture cross section of the formation in the formation zone of interest of the formation and shale ($\Sigma_r$) utilizing the algebraic expression:

$$\Sigma_r = [\Sigma_1\Sigma_{w2} - \Sigma_2\Sigma_{w1}/(\Sigma_{w2} - \Sigma_{w1}) - (\Sigma_2 - \Sigma_1)].$$

4. The method of claim 3 defined further to include the steps of:

running a third logging tool in the borehole in the formation having a tool response indicative of the formation neutron porosity ($\phi_n$) and indicative of the porosity of the shale component of the formation ($\phi_{sh}$);

determining the formation neutron porosity ($\phi_n$) at predetermined borehole depths utilizing the tool response of the third logging tool;

determining the porosity of the shale component of the formation ($\phi_{sh}$) at predetermined borehole depths utilizing the tool response of the third logging tool; and determining the formation fraction of bulk volume that is shale ($\rho$) utilizing the determined values of ($\phi_n$), ($\phi_{sh}$) and ($\phi_e$).

5. The method of claim 4 defined further to include the step of:

determining the thermal neutron capture cross section of the formation and shale ($\Sigma_r$) utilizing the algebraic expression:

$$\Sigma_r = [\Sigma_1 \Sigma_{w2} - \Sigma_2 \Sigma w1/(\Sigma_{w2} - \Sigma_{w1}) - (\Sigma_2 - \Sigma_1)]; \text{ and}$$

determining the formation matrix capture cross section ($\Sigma_{ma}$) at predetermined borehole depths utilizing the algebraic expression:

$$\Sigma_{ma} = [\Sigma_r - (\rho)(\Sigma_{sh})/1 - \rho].$$

6. The method of claim 4 wherein the formation fraction of bulk volume that is shale is defined further as being determined utilizing the following algebraic expression:

$$\rho = (\phi_n - \phi_e)/\phi_{sh}.$$

7. The method of claim 6 defined further to include the step of:

calibrating the tool response of a Gamma Ray Logging tool utilizing the determined values of the formation fraction of bulk volume that is shale ($\rho$) to calibrate the deviation of the Gamma Ray Logging tool response.

* * * * *

PO-1050
(5/69)

UNITED STATES PATENT OFFICE
CERTIFICATE OF CORRECTION

Patent No. 3,812,353      Dated May 21, 1974

Inventor(s) James L. Gilchrist

It is certified that error appears in the above-identified patent and that said Letters Patent are hereby corrected as shown below:

Column 8, line 25, "$\rho ma$" should be --$\sum ma$--.

Signed and sealed this 1st day of October 1974.

(SEAL)
Attest:

McCOY M. GIBSON JR.
Attesting Officer

C. MARSHALL DANN
Commissioner of Patents